June 23, 1959
L. BELOVE
2,892,006
TERMINAL SEALS FOR ALKALINE ELECTRIC BATTERIES
Filed Dec. 30, 1954
2 Sheets-Sheet 1
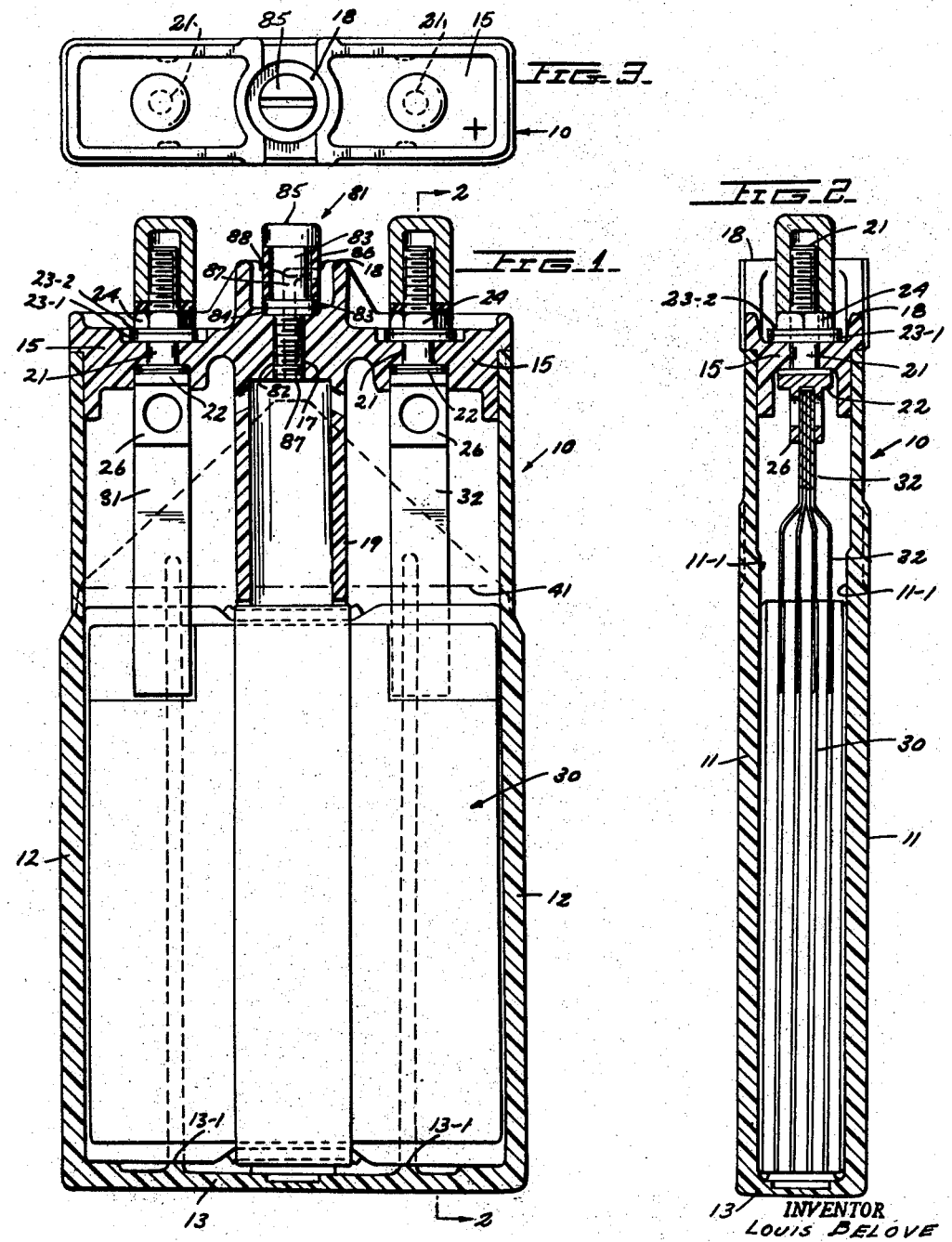
INVENTOR
LOUIS BELOVE
BY
*Greene, Pinelee & Burr*
ATTORNEYS June 23, 1959  L. BELOVE  2,892,006
TERMINAL SEALS FOR ALKALINE ELECTRIC BATTERIES
Filed Dec. 30, 1954  2 Sheets-Sheet 2
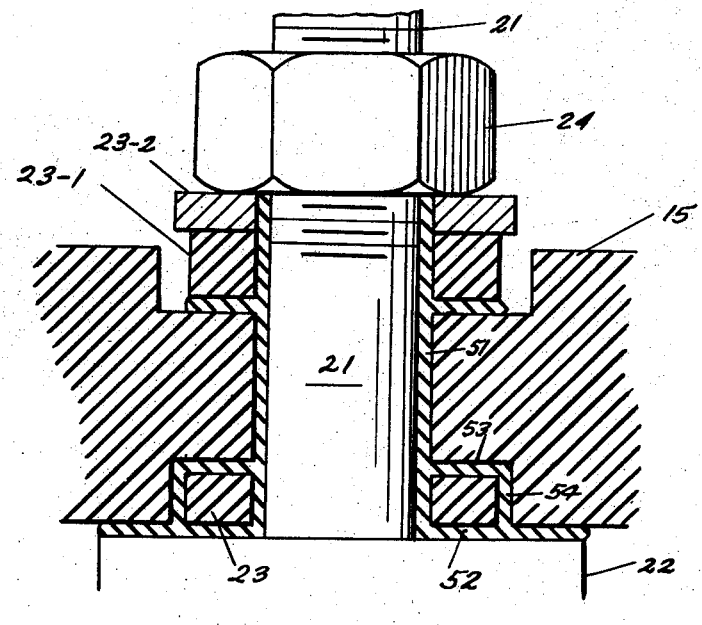
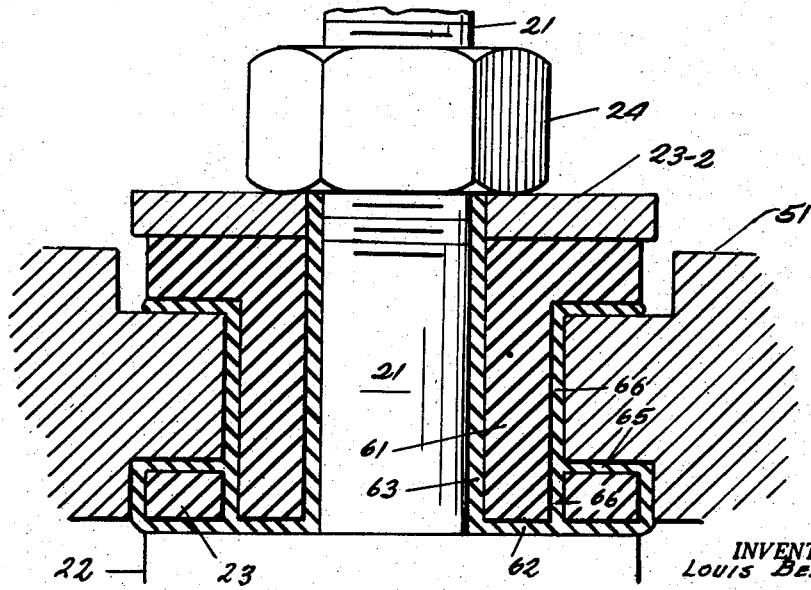
INVENTOR.
LOUIS BELOVE
BY
Greene, Pinckes & Durr
ATTORNEYS United States Patent Office 2,892,006
Patented June 23, 1959

2,892,006

TERMINAL SEALS FOR ALKALINE ELECTRIC BATTERIES

Louis Belove, Yonkers, N.Y., assignor to Sonotone Corporation, Elmsford, N.Y., a corporation of New York Application December 30, 1954, Serial No. 478,730

5 Claims. (Cl. 136—168)

This invention relates to alkaline-type electric batteries and more particularly to seals which prevent escape and leakage capillary or otherwise of the corrosive alkali electrolyte from the interior of the casing of such batteries to the exterior thereof.

Electric batteries of the alkaline type operate with alkaline liquid electrolyte filling the space between the battery electrodes which are enclosed in the usual battery casing having on one wall thereof one or more metallic battery terminals which are sealed through the casing wall and provide connections to the interior electrodes. Such alkaline-type batteries which have been on the market for many years past, have been always troubled by the fact that the corrosive alkali electrolyte tends to creep, by capillary action or otherwise along any crevices from the interior to the exterior surfaces, and, particularly along the junction or sealing surfaces between the battery terminals leads and the casing surfaces to which they are sealingly joined.

Even though the electrolyte loss by such creepage is not large, the damage done by the corrosive action in the escaped alkali electrolyte is very troublesome.

The present invention is based on the discovery that the seal of the metallic terminals through the insulating wall portions of the battery casing may be made safe against creepage of alkali electrolyte by forming the sealing junctions with a compressed elastic sealing member of rubber-like material which is united to the facing walls of the metallic terminal member and the casing wall which it passes by a thin stratum of epoxy-type resin, which stratum has a minute thickness, such as .010", which is only a small fraction of the thickness of the elastic sealing member.

The foregoing and other objects of the invention will best be understood from the following description of exemplifications thereof, reference being made to the accompanying drawings wherein Fig. 1 is a vertical sectional view of an assembled battery cell exemplifying one form of the invention;

Fig. 2 is a cross-sectional view along line 2—2 of Fig. 1;

Fig. 3 is a top elevational view of the battery cell of Fig. 1;

Fig. 4 is a detail view on an enlarged scale of the terminal seal; and

Fig. 5 is a detail view similar to Fig. 4 of a modified form of the invention.

The principles underlying the features of the invention disclosed herein will be explained by reference to one practical form of a battery cell shown in Figs. 1 to 3, and generally designated 10. The battery cell 10 comprises a flat casing having two extended side walls 11 with adjoining two narrow side walls 12 and a bottom wall 13, the casing space being enclosed at the top by a top wall 15. The housing walls 11 to 15 are all made of a suitable alkali-resistant material. Suitable resin materials for this purpose are the nylons, polyethylene terephthalate (Dacron), polyacrylonitrile, polystyrene, polyvinyl chloride and the like synthetic resins which are resistant to alkali solutions.

Within the top wall 15 are mounted and are held fixed and sealed therethrough with a fluid-tight seal, two metallic terminal members 21 of opposite polarity providing terminal connections to the opposite polarity battery plates of the electrode assembly generally designated 30 held within the interior of the casing 11. Each of the two terminal members 21 is made in the form of a metal shank, passing through an opening within the insulating top wall 15 and having on its inner side an enlarged head 22 held seated across an elastic sealing washer 23, of alkali resistant rubber material, such as neoprene, against the overlying seating surface of the top wall bordering the opening thereof. The shank head 22 is held clamped to its seat by a sealing nut 24 threadedly engaging the upper threaded portion of the terminal shank member 21 and clamped against the underlying seating surface of the top wall 15, thereby compressing the elastic sealing washer 23 held clamped by the underlying shank head 22 against the overlying top wall 15 so as to form a liquid-tight seal therewith. Sealing washer 23-1 similar to washer 23 and metal washer 23—2 are applied to the outer side of the top wall 15 and between it and clamping nut 24, for additionally sealing the upper side of top wall opening through which terminal member 21 passes.

The inner head 22 of each terminal member is provided with downwardly extending ear members 26 to which are affixed, as by welding, the upper ends of a superposed opposite polarity array of strip-like electrode leads or tabs 31, 32 of the battery assembly 30. The two terminal members 21 are made of alkali-resistant metal, such as nickel.

The inner faces of the large side walls 11 of the cell casing are provided with short rib projections 11—1 for holding the large side surfaces of the battery assembly 30 slightly spaced, such as by a gap spacing of about .020 to .040 inch, the inwardly facing side of the bottom casing wall 13 is provided at its opposite narrow end regions with the raised ledge portions 13—1 for holding the bottom edges of the electrode assembly 30 at a small gap spacing, such as .020 to .040 inch, above the surface of the bottom wall 14.

The battery assembly 30 is permeated by and held immersed within a liquid body of an electrolyte shown extending up to a level 41 which is higher than the upper level of the electrode assembly 30. The electrolyte of such nickel-cadmium batteries usually consists of a 20 to 35% (by weight) solution of potassium hydroxide KOH in water. Excellent results are obtained with a 30% solution of potassium hydroxide as the electrolyte.

As seen in Figs. 1 and 2, the battery top or cover wall 15 of the battery cell is relatively rigid and is provided with a generally rectangular border portion arranged to fit within the interior of the adjoining end of the battery cell casing 11. The interfitting surfaces of the top wall 15 and cell casing walls 11 are hermetically joined to each other as by a suitable alkali resistant cement, such as cementitious compounds of styrene, styrenated oils, styrenated synthetic resins which are commercially available on the market. Alternatively, the interfitting walls may be affixed to each other by heat sealing.

The electrolyte within the interior of the cell casing is maintained at a level of about ¼ to ½ inch above the upper level of the electrode plates of the electrode assembly 30.

In the form shown, the top wall of the battery casing has at its center a vent and filling opening 17. The top wall opening 17 is shown closed by a closure member 81 of alkaline resistant metal, to wit, nickel, having at its lower end a threaded portion 82 arranged to threadedly engage a threaded wall surface of the top wall opening 17. The closure member 81 is shown provided with an intermediate sealing flange 83 arranged to overlie and clamp an underlying sealing washer 84, of neoprene, for instance of which the closure member seals off the top wall opening 17 when the closure member is in its sealing position. The outer end of the closure member 81 is provided with a head 85 having on its exterior a slit so that its threaded inner end 82 may be readily screwed in and out, as by a screw driver, from its threaded engagement with the threaded top wall hole 17.

The outer head 85 of the closure member 81 has an intermediate section 83 which is enclosed with a tubular sealing sleeve member 86 of yieldable elastic rubber-like material. The closure member 81 is provided with a downwardly extending axial vent passage or bore 87 having at its top a lateral outlet opening 88 which is normally maintained sealed by the elastic pressure of the sealing sleeve 86. The vent passage 87 and its sealing sleeve 86 are so designed that under excessive gas pressure developed in the interior of the sealed cell casing 11, the gases will lift the sealing sleeve 86 from the vent outlet opening 88 and permit gases to escape therethrough.

The top wall 15 is provided with an upwardly extending central tubular wall portion 18 of the top wall 15 surrounding the outer part of the closure member 81 and serving as a well or retainer structure for retaining electrolyte discharged through the vent opening passage 87, 88 with the gases expelled therethrough.

The vent opening region 17 of the top wall 15 is also provided with an inwardly extending tubular spray baffle structure 19 for suppressing spraying of electrolyte into the top wall opening 17 by gases evolved during the charging operation. In the form shown, the tubular spray baffle 19 terminates at its lower end slightly above the upper edge of the battery plate assembly 30 and serves as a stop against outward movement of the battery assembly when it is accelerated by impact forces from its inward position towards the top wall 15.

The features of the battery described thus far are substantially similar to those shown in U. S. Patent 2,675,418 assigned to the assignee of the present application. However, even with the sealing arrangement between the terminal members of the battery and the casing wall through which they pass thus described a certain amount of corrosive alkali-electrolyte will creep into and through the microscopic spaces between the metallic terminal member portions 21 and the compressed sealing washers 23, 23—1 by which it is sealed through within its seating opening of the battery casing wall. In other words, the compressed sealing washers fail in themselves to eliminate the long existing troubles caused by creepage of alkali-electrolyte along the casing junction surfaces through which the battery terminal members pass to the exterior of the battery casing.

The present invention is based on the discovery that the mechanical sealing connection between the metallic terminal members and the casing walls of alkaline batteries through which they pass may be rendered positively sealed against leakage of alkaline electrolyte by providing the junction surfaces between the metallic terminal member and the synthetic resin casing wall a layer or stratum of an epoxy resin material or composition and curing the epoxy resin layer so that it forms a thin solid stratum of epoxy resin composition united to the metallic surface of the terminal member and also to the facing surface of the synthetic resin casing.

The present invention is also based on the discovery that by applying a fluid epoxy resin composition as sealing strata to the surfaces of the compressible sealing members or washers 23, 23—1 along which they face the terminal members and the casing wall portions for sealing them to each other, the epoxy resin sealing stratum will adhere and become united to the facing surfaces of the metal terminal member and the casing wall portions as well as to the surfaces of the compressible sealing washers, and that after curing, the so united sealing layers of epoxy resin will form positive sealing junctions between the metallic terminal members and the synthetic resin casing walls and will positively prevent any leakage of electrolyte along any sealing junctions between them. In practice, the sealing layers of epoxy resin are applied to the junction surfaces of the metal terminal member and the facing synthetic resin casing wall portions as well as the compressible sealing washers before compressing them, and the sealing layers of epoxy resin are cured after compressing the compressible sealing washers to their compressed sealing positions.

Fig. 4 is an enlarged view showing by way of example a sealing connection of the invention formed between terminal member 21 of the battery of Fig. 1 and the portion of the casing wall 15 through which it passes, some of the proportions being shown exaggerated for the sake of clarity. To the facing surfaces of the metallic terminal member 21 the opening in the casing wall 15 through which it passes are applied sealing layers 51, 52 of an epoxy resin composition which is fluid at room temperature. Similarly, sealing layers 53, 54 of the liquid epoxy resin composition are also applied to the surfaces of the compressible sealing washer 23 placed between facing surfaces of metallic terminal member 21 and the adjacent casing wall portions 15 of synthetic resin material. The epoxy resin composition sealing layers 51—54 may be applied to these surfaces before positioning terminal member 51 and compressible washer 23 in their position within the casing wall 15. Alternatively, terminal member 15 may be placed with the sealing washer 23 in position within the sealing opening of the casing wall 15 and before completing their assembly, a small quantity of the fluid epoxy resin is placed over the upper edge of the minute or small sealing gap between terminal member 21 and the casing cover 15 from which it emerges, the liquid epoxy resin being drawn by capillary action into the gap spaces between the terminal member 21 and the casing wall 15 and between them and the lower sealing washer 23 to provide the epoxy resin sealing layers 51, 52, 53, 54 between them. After so applying the sealing layers 51—54 of epoxy resin to the sealing surfaces between the terminal member 12 and casing wall 15 and their sealing washer 23, the assembled terminal member 21 within the casing wall 15 is completed and the nut 24 is tightened to compress the sealing washers 23, 23—1 in their sealing position as explained above.

Any of the known epoxy resin compositions which may be prepared in liquid form for application as thin sealing layers of a thickness of 0.001 to 0.010 inch or even up to 0.020 inch and which are thus at most one-tenth of the thickness of the elastic sealing washer 23, may be used for forming sealing layers of the invention, such as described above. Commercially available epoxy phenol resins which may be applied in liquid form at room temperature, are particularly suitable for use as sealing layers of the invention. Suitable are also epoxy polyester, and epoxy alkyd and epoxy polyamide resin compositions prepared in liquid form for application at room temperature. The sealing layers 51—54 of epoxy resin applied to the facing sealing surfaces of terminal member 21 and casing wall 15 are cured to a substantially solid state at room temperature within 24 hours and they are fully cured within about seven days.

As stated above, commercially available epoxy resin compositions when applied in accordance with directions supplied by their manufacturers will give the desired seals of the invention. Below are given additional examples of epoxy resin compositions suitable for seals of the inventions and of their applications. All proportions are given by weight.

*Example 1*

Approximately 92 parts of glycerol are mixed with 276 parts of epichlorhydrin. To this reaction mixture three parts of a diethyl ether solution containing 4.5% of boron trifluoride are added. The mass is cooled to maintain its temperature between about 50° C. and 75° C. for about 3 hours since the reaction is an exothermic one. About 370 parts of the resulting condensate are dissolved in 900 parts of dioxane containing about 300 parts of sodium aluminate. The mixture is agitated and heated in a refluxing apparatus at 93° C. for about 9 hours. After cooling the insoluble material is filtered off and the low boiling constituents are removed by distillation at 205° C. and 20 mm. pressure. About 261 parts of epoxy ether remain in the form of a pale yellow viscous liquid. To prepare the sealing agent, it is of advantage to add a curing agent to this resin. Various amines such as triethylamine, diethylamine, diethylaniline, methylaniline, triethanolamine, di-n-propylamine, di-isopropyl amine, benzylamine etc., are very satisfactory agents to decrease the time and temperature required for curing. For example, when 15% by weight of triethylamine are added to this glycerol-epichlorhydrin resin the resultant composition cures in about 24 hours at normal room temperature. After the triethylamine has been mixed with the epoxy resin the resultant composition remains fluid for several hours during which time it can be applied to the terminal seal of the battery of Fig. 4, for example.

*Example 2*

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes time a solution consisting of 5.62 parts of sodium hydroxide in 11.7 parts of water. This caused the temperature to rise to 62° C. Washing with water at 20 to 30° C. temperature was started 30 minutes later and continued for 4½ hours. The product was dried by heating to a final temperature of 140° C. in 80 minutes, and cooled rapidly.

When 10% of weight of benzyldimethylamine are added to this resin the composition sets in about six days at normal room temperature. It may be applied in a manner similar to that of Example 1.

*Example 3*

110 grams of resorcin are dissolved in 2 gramme-molecules of 20% solution of caustic soda, heated up to 75° C. and in the course of ½ hour, 180 grams epichlorhydrin are added drop by drop with continuous stirring. Stirring is continued for another hour, the product cooled and washed free from chlorine. The product is then dehydrated on the water-bath, in vacuo. To the fused product 5 grams piperidine are added and the whole mass is cooled down. There remains a hard resin having a melting point of about 65° C. which is soluble in acetone and benzene. The resin may be applied to the battery terminal in its fused condition or it may be dissolved in acetone and applied in the form of a solution. The resin hardens on being heated.

Fig. 5 shows another example of a leak proof battery terminal seal of the invention. The metallic terminal member 21 is held sealed in an opening of the battery casing wall 51 of synthetic resin material as in the similar arrangement of Fig. 4. A washer-like sealing member 23 and bushing-like sealing member 61 of rubber-like compressible material, such as neoprene, are held compressed between the nut 24, with its metal washer 23-2 and the terminal head 22 to provide a mechanically strong sealing assembly as in Fig. 4. Capillary leakage of alkali electrolyte from the interior of the battery casing 12 along the sealing surfaces of terminal member 21, are positively prevented by sealing layers 62, 63, 64, 65, 66 of epoxy resin composition provided between the facing surfaces of metal terminal member 21, the adjoining portions of casing wall 51 and the compressible sealing bushing 61 as well as compressible sealing washer 23. The sealing layers 62—66 are applied to these sealing surfaces and cured in a manner similar to those explained in connection with sealing layers 51—54 of Fig. 4.

The sealing arrangement of the invention shown in Fig. 5 may be modified by making the casing wall 15 of hard synthetic resin material to form a sealing opening contacting the cylindrical surface of the terminal member 21 passing therethrough and providing a sealing layer 63 of epoxy resin composition between these interfitting surfaces of terminal member 21 and casing wall 51.

In another modification similar to that of Fig. 5, the top wall 51 of the battery casing as well as the other walls of the battery casing may be made of metal. Each of the metallic terminal members 21 is held sealed in the metallic top wall 51 and insulated therefrom by a sealing bushing 61 of insulating material. The sealing bushing 61 may be of solid hard material and is united to the metallic casing wall 51 by a sealing layer of epoxy resin composition 66 to form a strong mechanical bond between them and also to provide a liquid tight seal which prevents leakage of alkaline electrolyte along the junction surfaces between them. The terminal member 21 is held affixed to the interior surfaces of the insulating bushing 61 by a sealing layer of epoxy resin composition 63 united to their facing sealing surfaces. Alternatively the insulating bushing 61 may be made of compressible rubber-like material, such as neoprene, and similarly united to the facing metallic walls of the casing 51 and the facing metallic terminal member 21 passing therethrough by cured sealing layers 63 and 66 of epoxy resin composition as described above.

It will be apparent to those skilled in the art that the novel principles of the invention disclosed herein in connection with specific exemplifications thereof will suggest various other modifications and applications of the same. It is accordingly desired that in construing the breath of the appended claims they shall not be limited to the specific exemplification of the invention described above.

I claim:

1. In an electric battery, a casing including a casing wall portion of electrically insulating organic resin material bordering a casing opening, an alkaline electrolyte and a plurality of opposite-polarity electrodes held enclosed within said casing, at least one metallic terminal member extending from one of said electrodes through said opening to the exterior of said battery, said metallic terminal member having an enlarged seating member underlying a facing interior casing wall portion adjoining said opening, clamping means engaging said terminal member and overlying an exterior casing wall portion adjoining said opening for forcibly clamping said seating member toward said facing casing wall portion, an elastic sealing member having relatively extended opposite sealing surfaces encircling said terminal member and held compressed between a surface of said clamped seating member and the surface of said facing casing wall portion for forming a seal against escape of said electrolyte from the interior of said casing through said casing opening, one of said continuous sealing surfaces of said sealing member being united to facing metallic portions of said seating member by a minute stratum of solidified epoxy resin, the opposite continuous sealing surface of said sealing member being united to the facing surface of said casing wall portion by a minute stratum of solidified epoxy resin, the thickness of each of said minute strata of epoxy resin being at most one-tenth of the thickness of said sealing member, whereby the united sealing member provides a yieldable elastic support connection between said terminal member and said casing wall impervious to electrolyte creepage.

2. In an electric battery as claimed in claim 1, said casing having a casing wall of insulating material having said casing wall portion which has said casing opening.

3. In an electric battery as claimed in claim 2, said casing wall having in addition to said one metallic terminal member at least one other insulating casing wall portion of said insulating material bordering at least one other casing opening, and one other metallic terminal member extending in a similar manner through said other casing opening, said other metallic terminal member being held sealed in said other casing opening by the same combination of elements as said one metallic terminal member is held sealed in said first-mentioned casing opening.

4. In an electric battery as claimed in claim 1, said casing having a casing wall of metal and a wall portion of insulating material in said wall of metal which borders said casing opening.

5. In an electric battery as claimed in claim 4, said casing wall of metal having at least one other wall portion of insulating material bordering at least one other casing opening, and at least one other metallic terminal member extending in a similar manner through the opening of said other insulating casing wall portion, said other metallic terminal member being held in said other opening of said casing wall by the same combination of elements as said one metallic terminal member.

References Cited in the file of this patent

UNITED STATES PATENTS

| | | |
|---|---|---|
| 1,237,733 | Willard | Aug. 21, 1917 |
| 1,279,953 | Willard | Sept. 24, 1918 |
| 1,368,817 | Marko | Feb. 15, 1921 |
| 2,100,921 | Rolph | Nov. 30, 1937 |
| 2,552,405 | Chapman | May 8, 1951 |
| 2,696,515 | Koren et al. | Dec. 7, 1954 |
| 2,706,166 | Gurney | Apr. 12, 1955 |

FOREIGN PATENTS

| | | |
|---|---|---|
| 874,836 | France | Oct. 27, 1942 |
| 630,663 | Great Britain | Oct. 22, 1947 |